(12) United States Patent (10) Patent No.: US 12,458,240 B2
Raschella (45) Date of Patent: Nov. 4, 2025

(54) METHOD FOR EVALUATION OF PHOTOPLETHYSMOGRAPHY SIGNAL PULSES

(71) Applicant: Onera Technologies B.V., Eindhoven (NL)

(72) Inventor: Flavio Raschella, Eindhoven (NL)

(73) Assignee: Onera Technologies B.V., Eindhoven (NL)

( * ) Notice: Subject to any disclaimer, the term of this patent is extended or adjusted under 35 U.S.C. 154(b) by 30 days.

(21) Appl. No.: 18/573,153

(22) PCT Filed: Jun. 20, 2022

(86) PCT No.: PCT/EP2022/066698
§ 371 (c)(1),
(2) Date: Dec. 21, 2023

(87) PCT Pub. No.: WO2022/268695
PCT Pub. Date: Dec. 29, 2022

(65) Prior Publication Data
US 2024/0315583 A1 Sep. 26, 2024

(30) Foreign Application Priority Data
Jun. 22, 2021 (EP) .................................... 21180727

(51) Int. Cl.
*A61B 5/024* (2006.01)
*A61B 5/00* (2006.01)
(52) U.S. Cl.
CPC ........ *A61B 5/02416* (2013.01); *A61B 5/7242* (2013.01); *A61B 5/7246* (2013.01); *A61B 5/7264* (2013.01)

(58) Field of Classification Search
CPC . A61B 5/02416; A61B 5/7242; A61B 5/7246; A61B 5/7264; A61B 5/7221
See application file for complete search history.

(56) References Cited

U.S. PATENT DOCUMENTS

2010/0185109 A1 7/2010 Zhang et al.
2014/0073877 A1 3/2014 Wooder
(Continued)

OTHER PUBLICATIONS

"An Algorithm for Real-Time Pulse Waveform Segmentation ..." by C. Fischer et al. J Biomed Health Informatics. vol. 21, No. 2, pp. 372-381. Mar. 2017.*

(Continued)

*Primary Examiner* — Jason M Ip
(74) *Attorney, Agent, or Firm* — Kagan Binder, PLLC (57) ABSTRACT

The present invention relates to a method (1) of evaluating a detected pulse in a Photoplethysmography. PPG, signal (10) in a PPG signal measurement, the method comprising the steps of (a) receiving the PPG signal comprising a plurality of pulses (20): (b) extracting pulses from the received PPG signal: (c) providing one or more predetermined pulse templates (30): (d) selecting one or more pulse templates (32) out of the provided pulse templates (30): (c) adapting the selected one or more pulse templates to the shape of a first pulse (22) out of the identified pulses (20) in the PPG signal (10); and (f) performing a morphological comparison between the first pulse (22) and each of the adapted one or more pulse templates (34) to provide a quantification of the difference (AD) between the first pulse and the adapted one or more pulse templates.

14 Claims, 5 Drawing Sheets

(56) References Cited

U.S. PATENT DOCUMENTS

2014/0323876 A1    10/2014    McGonigle et al.
2017/0143265 A1    5/2017    Hallberg
2017/0209055 A1*    7/2017    Pantelopoulos ..... A61B 5/7203

OTHER PUBLICATIONS

"Analysis of area under curve of PPG and its relation with HbA1c" by S. Usman. IEEE Conf Biomed Eng Sci. 2012.*
International Search Report and Written Opinion for International Application No. PCT/EP2022/066698, mailed Sep. 2, 2022, (15 pages).
Papini, "Sinus or not: a new beat detection algorithm based on a pulse morphology quality index to extract normal sinus rhythm beats from wrist-worn photoplethysmography recordings", Physiological Measurement, vol. 39, No. 115007, Nov. 26, 2018, (15 pages).
Karisik et al., "Template Adaptation of 2D Quasi-Periodic Data Using a Soft-Assign Localized Correspondence Matrix", IEEE Transactions on Signal Processing, IEEE Service Center, New York, NY, US, vol. 69, pp. 826-836, Dec. 31, 2020, (11 pages).

* cited by examiner

METHOD FOR EVALUATION OF PHOTOPLETHYSMOGRAPHY SIGNAL PULSES

CROSS-REFERENCE TO RELATED APPLICATIONS

This application claims priority to International Application No. PCT/EP2022/066698, filed Jun. 20, 2022 and titled "METHOD FOR EVALUATION OF PHOTOPLETHYSMOGRAPHY SIGNAL PULSES," which in turn claims priority from a European Patent Application having Ser. No. 21180,727.6, filed Jun. 22, 2021, all of which are incorporated herein by reference in their entireties.

TECHNICAL FIELD

The present disclosure relates to a method for photoplethysmography, PPG, signal measurement, and especially to such method comprising an evaluation of PPG signal pulses.

BACKGROUND

Unobtrusive technologies and wearable medical devices for systems retrieving and processing biological signals from the human body which are used to derive physiological parameters are rapidly evolving and their use in the healthcare sector is intensifying.

Photoplethysmography, PPG, is a technology that allows the extraction of both cardiovascular and respiratory parameters by measuring the variation of blood volume in the vessels. This information is highly indicative of a subject's health status and represents a precious resource for the development of methods to monitor physiological parameters as well as detect pathological conditions.

Assessment of the PPG signal quality plays a crucial role in the reliable estimation of physiological parameters. This is not a trivial task given the complex nature of the PPG signal and the technological difficulties in recording the signal itself.

The morphology of the PPG signal is affected by a wide spectrum of physiological phenomena. Variations in autonomic functions, blood pressure, oxygen saturation, cardiac output, and related diseases are all encoded in the blood flow measured by the PPG technology. Furthermore, depending on the body measurement site, these phenomena contribute differently to the shape of the PPG signal.

Furthermore, external technological factors have a non-negligeable influence on the PPG pulse morphology. Probe-tissue interface pressure, movement artifacts, room temperature, room light, as well as subject posture and breathing, affect the reproducibility of physiological measurement.

In conclusion, PPG signal variability due to the above-mentioned factors leads to inaccurate measurements and an incorrect estimation of the subject's physiological parameters.

Several methods for quality assessment of PPG signals have been proposed in the literature. Most relevant here are methods which assess the signal quality by evaluating the morphology of pulses associated to the change in blood volume of vessels. First, Papini, G. B. et al. (2018), "*Sinus or not: a new beat detection algorithm based on a pulse morphology quality index to extract normal sinus rhythm beats from wrist-worn photoplethysmography recordings*", *Physiological Measurement*, in which it is presented a method to assess the quality of the PPG signal by comparing the individual PPG pulse morphology to a pulse template derived from the PPG signal itself. This template would adapt based on the characteristics of the PPG signal. Furthermore, it focuses on the ability of the method to accurately identify normal sinus rhythm, rejecting all non-normal sinus rhythm (e.g. arrhythmic beats) and artifacts. Second, Li, Q. & Clifford, G. D. (2012), '*Dynamic time warping and machine learning for signal quality assessment of pulsatile signals*', *Physiological Measurement* 33(9), 1491, which discloses a method to assess PPG signal quality by extracting multiple features associated to each individual PPG pulse and feeding them into a multi-layer perceptron neural network. This neural network would learn to distinguish between good and bad pulses previously labelled by an expert.

Methods based on adaptive templates, such as the one mentioned from Papini et al., suffer from issues related to noisy signals. Unconstrained building of adaptive templates may lead to distorted templates and consequent false rejection of good pulses. Further, there is a limitation of their method in the inability to distinguish normal sinus rhythm when arrhythmic conditions are present in the PPG recording. Indeed, the template creation is affected by the presence of non-normal sinus rhythm pulses.

Methods based on machine learning techniques exhibit well-known limitations. First, the algorithm performance is as good as the quality of the signals used for training, and also depends on the richness of information contained in the signals. Secondly, they strongly depend on available labelling performed by experts, which is not always accurate. Finally, the choice of features used to describe the phenomenon of interest are often not exhaustive and limited to the observed datasets.

To conclude, these algorithms may lead to severe misclassifications when exposed to new datasets and may need periodic adjustments in feature selection and retraining in order to avoid pulse misclassification.

Consequently, there is a need for a method of evaluating a PPG signal which is efficient and robust in avoiding misclassification.

SUMMARY

It is an object of the present invention to provide an improved solution that alleviates the mentioned drawbacks with present devices. Furthermore, it is an object to provide method for evaluating PPG signal pulses that minimizes the risk for misclassification of pulses.

The invention is defined by the appended independent claims, with embodiments being set forth in the appended dependent claims, in the following description and in the drawings.

According to a first aspect of the invention, a method of evaluating a detected pulse in a Photoplethysmography, PPG, signal in a PPG signal measurement is provided, the method comprising the steps of (a) receiving the PPG signal comprising a plurality of pulses; (b) extracting pulses from the received PPG signal; (c) providing one or more predetermined pulse templates; (d) selecting one or more pulse templates out of the provided pulse templates; (e) adapting the selected one or more pulse templates to the shape of a first pulse out of the identified pulses in the PPG signal; and (f) performing a morphological comparison between the first pulse and the adapted one or more pulse templates to provide a quantification of the difference between the first pulse and each of the adapted one or more pulse templates.

By such method, a measurement using a PPG signal may be improved since the pulses of the PPG signal are evaluated, providing that bad quality pulses may be rejected. By rejecting or ignoring pulses determined to be of bad quality or unreliable, the outcome of the measurement may have an improved reliability and may be used for determinations requiring a high quality standard of the measurement. Such determination of e.g. physiological parameters of an individual may then be based on measured biological signals of improved quality. Since the determination relate to an individual's health status, a more reliable measurement is a significant advantage.

In the prior art, e.g. in the disclosure of Papini et al., the method therein is used to identify normal sinus rhythm and reject all non-normal sinus rhythm (e.g. arrhythmic beats) and artifacts. This is applied to a condition where the pulse shapes are very similar among each other, and any variation is rejected.

In the method according to the present invention, only artifacts and PPG pulses affected by artifacts may be rejected. Furthermore, both normal and non-normal sinus rhythms may be detected. This is provided by the steps of the method as described above.

Pulses in the PPG signal are physiological waveforms due to cardiac changes in the blood volume at each heartbeat. As such, PPG pulses may have very distinguishable features that may be used to derive comparative templates. Depending on multiple factors, physiological or not (e.g., change in posture), the pulse morphology may change slightly. Therefore, to improve the accuracy in detecting good quality pulses, several templates may be designed to adapt to different conditions. Each template may be obtained as an average of good quality pulses derived from a specific recording condition. Hence, the plurality of pulse templates may be based on different aspects, used to evaluate the first pulse in different conditions.

From the plurality of predetermined pulse templates, one or more pulse templates may be selected. If one pulse template is selected, conditions may be set to provide predetermined criteria for selection of a pulse template. Such criteria may be based on the characteristics or properties of the PPG signal or the first pulse. In another embodiment more than one pulse template out of the plurality of pulse templates may be selected. In one embodiment, all pulse templates out of the plurality of pulse templates may be selected. When two or more, or all, pulse templates are selected, each of these pulse templates may be adapted to the shape of the first pulse. Further, each of these adapted pulse templates may be used for separate morphological comparisons to the first pulse to provide a plurality of quantifications of the difference between the first pulse and each of the plurality of pulse templates. The plurality of quantifications may then be used to evaluate the first pulse, for instance by determining the highest or lowest quantification of the difference to a pulse template.

The step (b) of extracting pulses from the received PPG signal may comprise a step of (b1) identifying pulses in the PPG signal by identifying tops and/or valleys in the PPG signal.

The one or more predetermined pulse templates may in one embodiment be a plurality of predetermined pulse templates, comprising at least two pulse templates.

In one embodiment, the step of (b) extracting pulses may further comprise a step of (b3) pulse normalization of the PPG signal prior to the step (e) of adapting the one or more pulse templates to the shape of the first pulse. The amplitude of the PPG signal may vary during the recording. These changes may be due to a variety of physiological or non-physiological events, such as increase in blood oxygenation or increase in probe-tissue interface pressure. To remove the influence of amplitude in the pulse morphology comparison, pulses may be individually normalized.

In one embodiment, the step of (b) extracting pulses from the PPG signal may comprise a step of identifying valleys in the PPG signal and define a pulse as a portion of the PPG signal between two consecutive valleys. Further, morphological information of the identified pulses may be extracted. Such information may for instance comprise at least one of: amplitude of the pulse, duration of the pulse, and time to peak of the pulse.

In one embodiment, the method may further comprise a step of (b2) rejecting one or more identified pulses in the PPG signal prior to the step (e) of adapting the pulse template to the shape of the first pulse. There may be pulses in the PPG signal that may easily be determined as bad quality pulses that should be rejected in order to improve the measurement. By rejecting such pulses prior to the steps of selecting and adapting the pulse template, computational performance required may be decreased and speed of the process may be increased.

In one embodiment, the step of (bb) extracting pulses from the PPG signal may comprise extracting information of the amplitude of the identified pulses and/or the duration of the identified pulses, and the step of (b2) rejecting one or more identified pulses may comprise a step of determining whether the amplitude and/or duration of an identified pulse deviates from the amplitude and/or duration compared to a previous pulse or pulses with a predetermined amount. Further, the identified pulse may be rejected if its amplitude and/or duration deviate with the predetermined amount or more. Bad quality pulses may thereby be rejected in an early stage when the amplitude and/or duration of the pulse indicates that something is wrong with the measurement. A too long or too short duration may provide an unreasonable heartbeat indicating an incorrect measurement. An abrupt increase in amplitude of a pulse may equally indicate an incorrect measurement.

In one embodiment, the step of (f) performing a morphological comparison may comprise a step of (f2) determining a difference in area under a curve of the first pulse and a curve of each of the adapted one or more pulse templates; and a step of (f3) comparing the difference in area with a predetermined threshold. Thereby, the adapted one or more pulse templates, being selected out of the plurality of available pulse templates and adapted to the shape of the first pulse, may be used to evaluate the quality of the first pulse by identifying the difference in area. This may provide a quantitative measurement of the first pulse relative a pulse template. If selecting two or more, or all, of the pulse templates, a plurality of differences in area may be provided. The evaluation may then be based on one of the extreme values of the determined differences in area, i.e. the largest difference between a pulse template and the first pulse, or the smallest difference between a pulse template and the first pulse. The smaller difference in area may indicate a high quality of the first pulse based on the high level of similarity between the first pulse and a pulse template.

In one embodiment, the step of (f) performing a morphological comparison may further comprise a step of (f4) determining a binary quality value of the first pulse as 1 if the difference in area is below said predetermined threshold and as 0 if the difference in area is above said predetermined threshold. The binary quality value may be used for the evaluation of the pulse by providing a further quantitative measurement of the first pulse and its quality. Such binary quality value may be determined for each pulse of the PPG signal such that bad quality pulses in the PPG signal may be rejected, improving the measurement and the reliability of the PPG signal. In an embodiment where two or more, or all, pulse templates are adapted to the shape of the first pulse and used for morphological comparison with the first pulse, a binary quality value may be determined based on one of the differences in area determined based on the two or more pulse templates. For instance, the determined smallest difference in area for the first pulse and a pulse template may be used to determine the binary quality value of the first pulse. Alternatively, the determined largest difference in area for the first pulse and a pulse template may be used to determine the binary quality value of the first pulse. In another embodiment, a plurality of binary quality values may be determined, one for each pulse template comparison. For the first pulse, the evaluation may be based on the plurality of binary quality values, such that for instance the quality of the first pulse is determined as satisfactory (good quality pulse) if at least one or at least a predetermined number of determined binary quality values for the first pulse is 1. Based on such criteria, the first pulse may then be assigned the binary quality value 1.

In one embodiment, the step of (f) performing a morphological comparison further may comprise a step of (f1) performing a Dynamic Time Warping, DTW, stretch of the first pulse prior to the step of (f2) determining a difference area. The DTW stretch may be performed to adjust the first pulse for small physiological changes in the pulse. This may improve the similarity between the shapes of the first pulse and the adapted one or more pulse templates.

In one embodiment, the step of (e) adapting the selected one or more pulse templates may comprise a step of (e1) normalizing each of the pulse templates. By normalizing both the first pulse (and/or all pulses of the PPG signal) and the pulse template, the similarities between the first pulse and the one or more pulse templates may be improved. The pulses of the PPG signal may already have been determined in terms of abnormal amplitude, providing that the first pulse, not having been rejected in such process, has a relevant amplitude for comparison to a pulse template.

In one embodiment, the step of (e) adapting the selected one or more pulse templates may comprise a step of (e2) adapting the duration of each of the pulse templates to correspond to the duration of the first pulse. In order to adapt the one or more pulse templates to the first pulse, the duration of the pulse template may be stretched. The first pulse may be identified as the duration between two valleys in the PPG signal. Each pulse template may correspondingly be represented by a pulse starting and ending at valley points. The starting and ending points of each pulse template in a time curve may thereby be changed to have a duration corresponding to the duration of the first pulse. The curve of the one or more pulse templates between the starting and ending points may be correspondingly adapted by time stretching. This may provide a maximized similarity between each pulse template and the first pulse. Furthermore, each pulse template may be adapted to the temporal physiological characteristics of each specific subject's PPG pulses. Inter-subject variability in heart rate may lead to misclassification of good quality pulses. This issue may be addressed by adaptively adjusting the pulse templates' duration to the subject's pulse duration.

In one embodiment, the method may further comprise a step of (g) detecting misclassifications of the first signal after the morphological comparison. The morphological comparison may for instance provide a binary quality value of the first pulse as discussed above. The binary quality value may provide a classification of the first pulse as a good quality pulse or a bad quality pulse. After such determination, a step may be performed to determine if there may be a misclassification made of the first pulse. The misclassification may be that the first pulse is determine as good quality when should be bad quality, and vice versa. The misclassification detection may be based on for instance classifications of other pulses adjacent to the first pulse in the PPG signal, or on identified parameters of the first pulse.

In one embodiment, the steps (d)-(f) may be performed for a plurality of PPG pulses in the PPG signal, and the step of (g) detecting misclassifications may comprise a step of (g1) comparing the binary quality value of the first pulse with binary quality values of at least two pulses adjacent to the first pulse in the PPG signal; and, if the binary quality value for the first pulse is 1 and the binary quality values for the at least two adjacent pulses are 0, a step of (g2) change the binary quality value of the first pulse to 0. Alternatively or additionally, the step of (g1) may comprise comparing the binary quality value of the first pulse with binary quality values of at least two pulses adjacent to the first pulse in the PPG signal; and, if the binary quality value for the first pulse is 0 and the binary quality values for the at least two adjacent pulses are 1, the step of (g2) comprises changing the binary quality value of the first pulse to 1. This filter applied for identifying possible misclassifications may be assigned a degree of flexibility dependent on the length of the pulse window used for the misclassification assessment.

In one embodiment, the step of (g) detecting misclassifications may comprise a step of (g3) forming a signal vector by the binary quality values of the plurality of pulses of the PPG signal, indicating a value of 0 in periods of the PPG signal comprising pulses determined to have a binary quality value of 0 and a value of 1 in periods of the PPG signal comprising pulses determined to have a binary quality value of 1. Further, the border between a 1 value period to a 0 value period in the signal vector may be adjusted by a predetermined duration to increase the duration of the 0 value period. Such adjustment may be made in order to reject portions of the PPG signal which may comprise unreliable information by being close to portions determined as bad quality.

In one embodiment, the steps of (d) selecting one or more pulse templates and (e) adapting the selected one or more pulse templates to correspond to the shape of the first pulse may be performed using at least two pulse templates, and the step of (f) performing a morphological comparison may be performed separately using all of said at least two adapted pulse templates. To determine which pulse template to use, the adaption to the first pulse may be made to a plurality of pulse templates. In one embodiment, the pulse template may be provided in a database of pulse templates, and the plurality of pulse templates used for the selection of a pulse template to be used for morphological comparison may be a portion of the pulse templates in the database. In one embodiment all pulse templates of the plurality of pulse templates in the database may be used for adaption and morphological comparison.

According to a second aspect of the invention, an apparatus is provided comprising means configured to perform the steps of the method according to any of the embodiments above.

A predetermined pulse template may be a waveform that follows the shape of a pulse in a PPG signal.

The one or more predetermined pulse templates may be pulse templates determined using one or more PPG signals not associated with the PPG signal measurement provided in the method for evaluation. The PPG signal measurement provided in the method may be a PPG signal measurement of a first subject. The one or more predetermined pulse templates may be pulse templates determined based on PPG signal measurements of at least a second subject different from the first subject or based on PPG signal measurements of a plurality of subjects different from the first subject.

The one or more predetermined pulse templates may be created through mathematical equations or derived from PPG signals recorded from healthy subject. By healthy subject, it may be meant a subject characterized by a health profile comprising one or more health aspects and the subject is healthy in a majority of these health aspects or in all of the health aspects. Alternatively, or in combination, one or more predetermined pulse templates may be created through mathematical equations or derived from PPG signals recorded from subjects diagnosed with a medical condition. As an example, when the one or more predetermined pulse templates are obtained through statistics applied on multiple PPG pulses of similar shape, pulses may be linearly interpolated to a standard length and averaged (mean) point-by-point.

A PPG pulse signal measured on a healthy subject may assume different shapes due to physiological variability between healthy subjects. Therefore, multiple templates may be generated to account for this variability.

One or more predetermined pulse templates may include one or more of the following PPG pulse types: symmetrical PPG pulses without a dicrotic notch; asymmetrical PPG pulses of with a dicrotic notch, and/or asymmetrical PPG pulses without a dicrotic notch, and/or other PPG pulse types.

Each respective pulse template of the one or more predetermined pulse templates may be associated with a respective health profile. A health profile may comprise a plurality of health parameters and/or physiological parameters.

The PPG signal measurement provided in the method may be a PPG signal measurement of a first subject. The one or more predetermined pulse templates may be pulse templates determined using one or more PPG signals originating from PPG signal measurements of at least a second subject different from the first subject. The at least a second subject may have a health profile at least partially similar in one or more relevant health parameter and/or physiological parameters as the first subject or have a health profile at least similar in a majority of health parameters and/or physiological parameters or at least similar in 55%, 60%, 65%, 70%, 75%, 80%, 85%, 90%, 95% of health parameters and/or physiological parameters as the first subject. One or more health parameters may for example include age, weight, sleep quality and/or pattern, fitness, medical condition, disability, genetic predisposition, etc. Relevant health aspect may be one or more health aspects determined to be relevant based on the health profile of the first subject and known health aspect correlation.

The one or more predetermined pulse templates may be provided in a database of pulse templates as previously explained. The one or more predetermined pulse templates may be provided in a database and associated with a respective health profile. An advantage of providing predetermined pulse templates and using these in the method of evaluating a detected pulse in a PPG signal measurement is that it removes a source of error during the evaluation. As an alternative, a pulse template may be directly derived from the PPG signal subject for evaluation in terms of quality in relation to the pulse template created. Such a solution consequently results in the pulse template being dependent on the PPG signal measurement provided for evaluation. If the PPG signal measurement is of subpar quality, then there is a risk that the pulse template derived from such a PPG signal measurement is also of subpar quality and the resulting evaluation may be unreliable and misclassifications of the quality of a pulse signal may occur more frequently. Further, such a solution limits the ability to compare PPG signal evaluation results originating from PPG signal measurements from different subjects as the respective pulse templates may differ significantly in quality. By using predetermined pulse templates, it is possible to compare evaluations of PPG signal measurements from different subjects where the same predetermined pulse template has been used in the morphological comparison. Moreover, it removes a source of error since no pulse template must be created for the morphological comparison.

In one embodiment, the step of (f) performing a morphological comparison may comprise a step of (f2) determining a difference in area under a curve of the first pulse and a curve of each of the adapted one or more pulse templates; and a step of (f3) comparing the difference in area with a predetermined threshold. An advantage of comparing the difference in area with a predetermined threshold is that it only requires setting one predetermined threshold. The predetermined threshold may be selected as an absolute area value or a relative area value. As an alternative to comparing a difference in area, a PPG signal may be compared point-by-point to a pulse template. However, such a solution is more sensitive with regards to deviations on a point-by-point basis, which consequently may result in misclassification. The steps of the method may be performed by means of an apparatus comprising means configured to perform said steps. The means may comprise one processing unit or a plurality of processing units. The means PPG signal measurement may be measured by means of a sensor device. The sensor device may comprise one or more sensors for measuring a PPG signal of a subject. The sensor device may be a patch device for arrangement on a body of the subject. The apparatus may comprise a memory unit. The PPG signal measurement may be stored on the memory unit. The apparatus may comprise means for providing the PPG signal measurement to the memory unit or to an external memory unit. The predetermined pulse template may be provided in a database. The database may be stored locally on a memory unit. The database may be stored remotely, for instance on a server.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
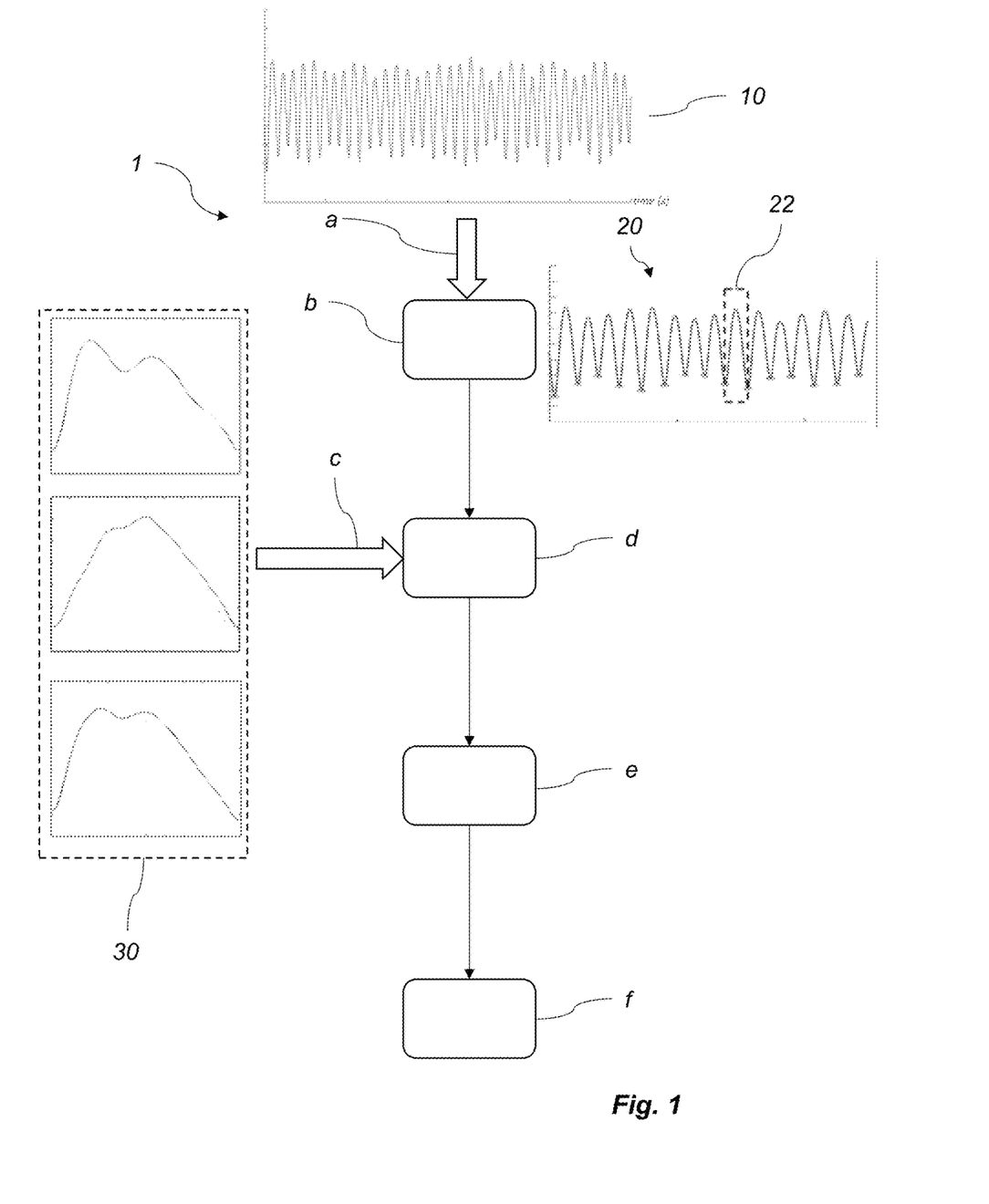
FIG. 1 is a schematic flow chart of a method according to an embodiment of the invention.

FIG. 1 illustrates a method 1 according to an embodiment of the invention. The method 1 comprises a first step a of receiving a PPG signal 10. The PPG signal 10 comprises a plurality of pulses. In one embodiment, the PPG signal 10 is filtered before being received in step a. The plurality of pulses in the PPG signal 10 are extracted in step b. Individual pulses are thereby identified. The identified pulses 20 are extracted and identified by identifying the tops and/or valleys in the PPG signal 10. In a preferred embodiment, the valleys are identified, as illustrated in FIG. 1.

Figure 2:
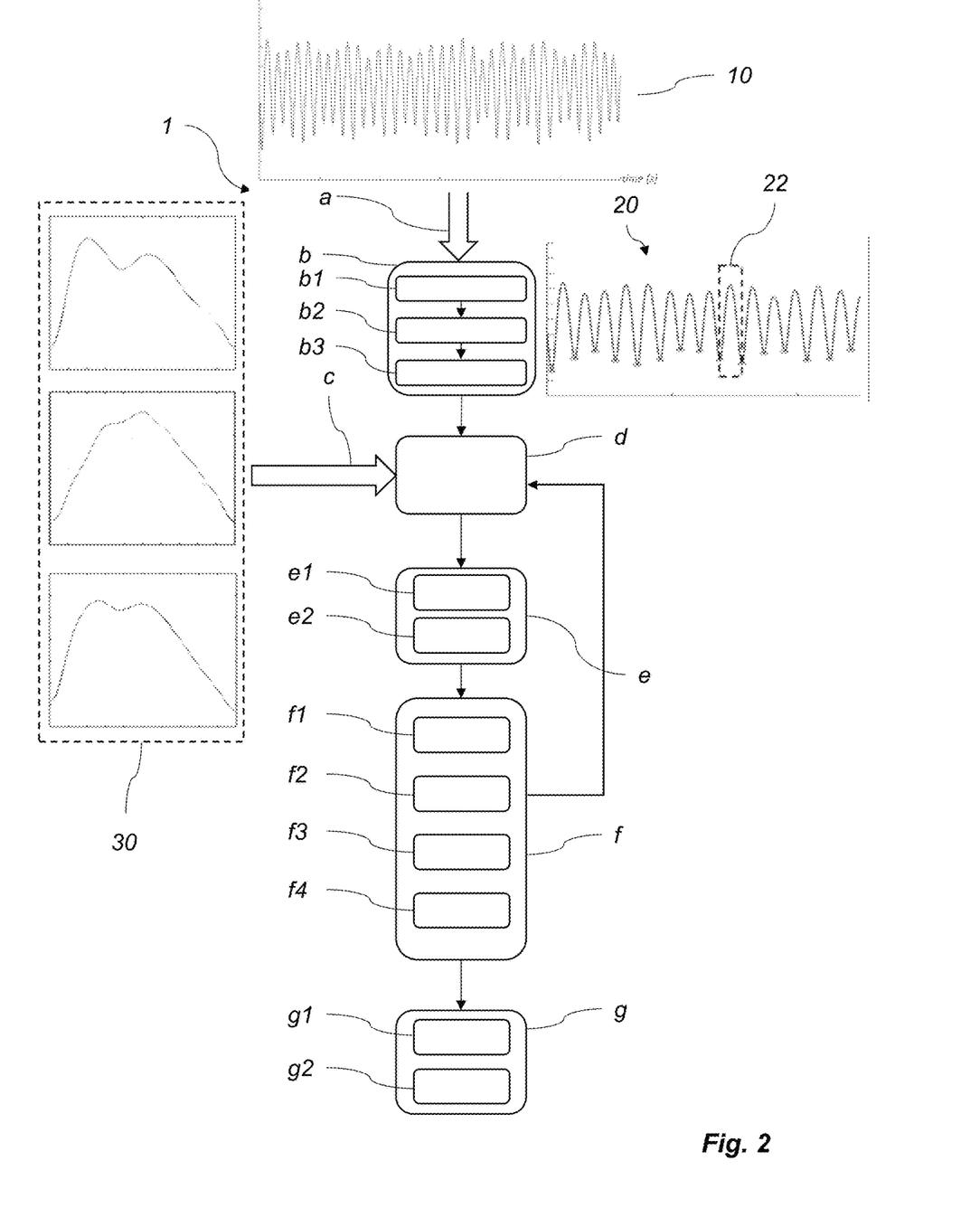
FIG. 2 is a schematic flow chart of a method according to an embodiment of the invention.

To the method 1 there is provided in step c one or a plurality of predetermined pulse templates 30. The predetermined pulse templates 30 are at least two individual pulse templates 30 defining different pulse shapes of PPG pulses. In step d of the method 1 one or more pulse templates 32 of the plurality of pulse templates 30 is selected. In a preferred embodiment, a plurality of pulse templates 32 are selected. Such embodiment will be described below, even though the method 1 may be equally applicable on an embodiment only selecting one pulse template.

In step e the selected pulse templates 32 are adapted to the shape of a first pulse 22 in the PPG signal 10. The first pulse 22 is one of the identified pulses 20 in the PPG signal 10.

In the final step f a morphological comparison between the first pulse and each of the adapted pulse templates 34 is performed. This provides a quantification of the difference between the first pulse 22 and the adapted pulse templates 34.

FIG. 2 illustrates an extended version of the method 1 according to an embodiment of the invention. The step b of extracting pulses from the PPG signal 10 comprises a step b1 of identifying pulses 20 in the PPG signal 10. The method comprises an additional step b2 of rejecting one or more of the identified pulses 20 in the PPG signal.

Further, the method 1 comprises a step b3 of normalizing the pulses of the PPG signal 10. The steps b1-b3 may be performed in another order than illustrated, but need to be performed prior to step e of adapting the pulse templates 32.

Further, the step e of adapting the pulse templates 32 comprises step e1 of normalizing the selected pulse templates 32 and step e2 of adapting the selected pulse templates 32 by adapting the duration of the pulse templates 32 to correspond to a duration tD of the first pulse 22.

The step f of performing a morphological comparison comprises a step f1 of performing a Dynamic Time Warping, DTW, stretch of the first pulse 22. After the DTW stretch f1 of the first pulse 22, there is a step f2 of determining a difference in area AD under the curve of the first pulse 22 and the curve of each of the adapted pulse templates 34. The determined difference in area AD is then compared in a step f3 with a predetermined threshold.

In the illustrated embodiment, the method 1 further comprises a step f4 of determining a binary quality value BQ of the first pulse 22. The BQ of the first pulse is determined to 1 if the difference in area AD is below a predetermined threshold, and determined to 0 if the difference in area AD is above the predetermined threshold. When performing morphological comparison with a plurality of adapted pulse templates 34, the BQ for the first pulse 22 is determined based on the pulse template 34 providing the smallest difference in area AD to the first pulse 22. Alternatively, the BQ for the first pulse 22 is determined based on the pulse template 34 providing the largest difference in area AD to the first pulse 22. In an alternative embodiment, a plurality of binary quality values BQ are determined. The first pulse 22 may in the end be assigned a binary quality value BQ being based on the determined plurality of binary quality values BQ. For instance, the first pulse 22 may be assigned a binary quality value BQ of 1 if at least one, or at least a predetermined number, of the determined plurality of binary quality values BQ is 1. Equally, the first pulse 22 may be assigned a binary quality value BQ of 0 if at least one, or at least a predetermined number, of the determined plurality of binary quality values BQ is 0.

Further in the illustrated embodiment of FIG. 2, the method 1 comprises a post-processing step g of detecting misclassifications of the first pulse 22 after the morphological comparison. The misclassification may be that the BQ for the first pulse 22 has erroneously been set to 1 or 0. The step g is applied in the method 1 when steps d-f are performed for a plurality of identified PPG pulses 20 in the PPG signal 10. The step g comprises a step g1 of comparing the BQ of the first pulse 22 with BQs of at least two pulses adjacent to the first pulse 22 in the PPG signal 10. If the BQ of the first pulse 22 is 1, and the BQs of the at least two adjacent pulses are 0, then, in a step g2, the BQ of the first pulse 22 is changed to 0. The binary quality values BQ used for the misclassification detection are, in embodiments where a plurality of binary quality values BQ are determined based on a plurality of pulse templates, the BQ assigned to each pulse based on the determined plurality of BQ. The step g of detecting misclassifications further comprises a step g3 of forming a signal vector 50 by the binary quality values BQ of the plurality of pulses 20 of the PPG signal 10. This is further described below in conjunction with FIG. 5. The step g of detecting misclassifications may comprise one, two or all of the steps g1-g3 as described above.

As illustrated in FIG. 2 the steps d-f may be seen as repeated in at least one iteration to be performed using at least two pulse templates 34. The step f of performing the morphological comparison is performed for each of the adapted pulse templates 34. For each iteration, a new pulse template 32 is adapted to the shape of the first pulse 22 and morphologically compared to the first pulse 22. The provided pulse templates 30 may be used for evaluating all pulses 20 of the PPG signal 10. All provided pulse templates 30 may in one embodiment be used for morphological comparison of all pulses 20 of the PPG signal 10.

Referring both to FIGS. 1 and 2, pulses in the PPG signal 10 are characterized by distinguishable features associated to cardiac events. The raw PPG signal 10 is in one embodiment filtered to extract two versions of the signal expressing different features of interest:

$PPG_1$: a bandpass filter to remove the diastolic peak from each pulse and the low-frequency components associated to respiration and movement artifacts. This smoother version of the raw signal may allow for a simple identification of separation points between pulses.

$PPG_2$: a bandpass filter to remove low and high-frequency components while able to preserve the pulse morphology. This version of the signal may be used to extract features related to pulses.

This filtering may be performed prior to identifying pulses 20 in the PPG signal 10.

$PPG_1$ is used in step b1 to identify the pulses 20. Valleys in the $PPG_1$ signal is used to discriminate the beginning and the end of e.g. the first pulse 22. The valleys may be found for example according to the following formula:

$$v = \{v | \text{sign}(P\dot{P}G_1(t)) \neq \text{sign}(P\dot{P}G_1(t-1)) \ \& \ P\ddot{P}G_1(t) > 0 \ \& \ PPG_1(t) < 0\}$$

where v represent a valley, $P\dot{P}G_1$ and $P\ddot{P}G_1$ represent the first and second derivative of $PPG_1$, respectively. This formula is composed of a sequence of rules to identify deflection points in the signal that are characteristic of the valleys. This is illustrated for the identified pulses 20 in FIGS. 1 and 2.

The first pulse 22 is defined as the signal between two consecutive valleys. Although valleys are identified through the $PPG_1$ signal, pulses are derived from the $PPG_2$ signal which preserves the pulse morphology.

Figure 3:
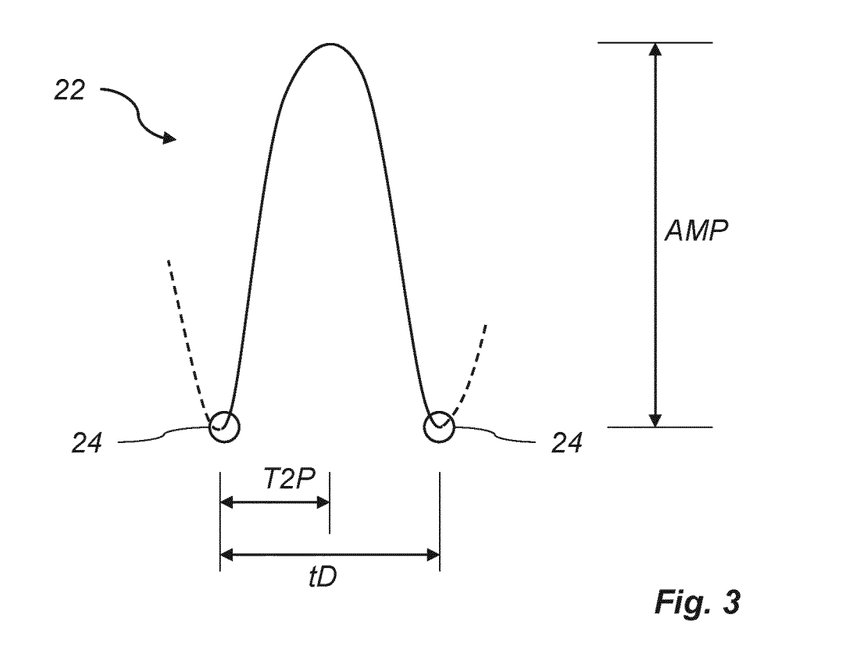
FIG. 3 is a schematic diagram of a pulse according to an embodiment of the invention.

In one embodiment of method 1, the step b of extracting pulses 20 from the PPG signal 10 comprises extracting morphological information from each identified pulse 20. This may for example be information of the amplitude AMP of the identified pulses 20 and/or the duration tD of the identified pulses. Alternatively or additionally, the Time to peak T2P is extracted, being the amount of time from the beginning of the pulse to the systolic peak. This is illustrated in FIG. 3 wherein the amplitude AMP, duration tD and time to peak T2P for the identified first pulse 22 are determined. Further, FIG. 3 illustrates the identified valleys 24 providing the end points of the first pulse 22.

The step b2 of rejecting one or more of the identified pulses 20 is implemented to reject pulses 20 that exhibit unphysiological characteristics. Rejected pulses can then be excluded from further analysis.

Pulses with an abrupt increase in amplitude compared to one or more previous pulses are rejected. One embodiment to provide this is a causal filter being applied to a time-series composed of the pulse amplitudes to identify such pulses. A sliding window scrolls over the identified pulses 20 and decides whether to reject incoming values:

$$\text{reject} = \begin{cases} \text{true} & \text{if } x(t) > amp_{thr} * mean(x(t-1), x(t-2), \ldots, x(t-n)) \\ \text{false} & \text{otherwise} \end{cases}$$

where x is the time-series of the amplitude, $amp_{thr}$ is a selected threshold to regulate the amount of deviation of the new pulse in the window compared to the mean of the previous pulses, and n is the length of the sliding window. If the first pulse 22 amplitude exceeds the value calculated based on the previous pulses, it is rejected. If pulses in the sliding window have already been rejected, these are not considered when computing the window's mean amplitude. In the case where all pulses are rejected, the sliding window is shifted until reliable amplitudes are found.

Furthermore, pulses with duration outside a specified interval are rejected. These may be pulses with a duration lower than 0.3 seconds or higher than 2 seconds, corresponding to a heart rate between 200 and 30 beats per minute. These boundaries are identified as limits for normal physiological conditions.

An advantage of the present method 1 is the use of a plurality of pulse templates 30 used in the method 1 to detect good quality PPG pulses. The pulse templates 30 are designed to adapt to different conditions. Each pulse template may for example be obtained as an average of good quality pulses derived from a specific recording condition. As an illustrative example, the plurality of pulse templates 30 in FIGS. 1 and 2 are provided as three different pulse templates.

Figure 4:
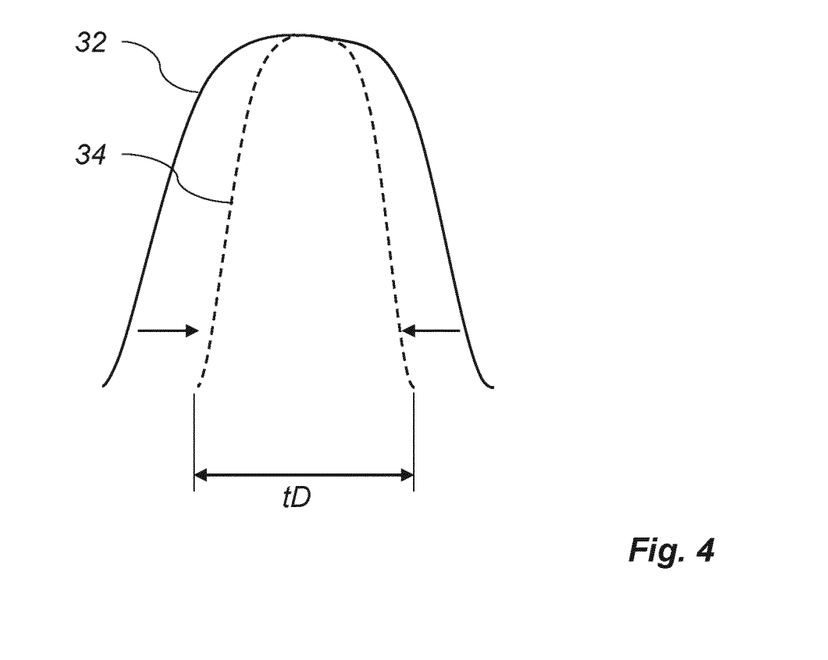
FIG. 4 is a schematic diagram of a pulse template according to an embodiment of the invention.

To allow for morphological comparison to the normalized pulses in step f, templates may be normalized as well. Furthermore, each pulse template 30 is adapted to the temporal physiological characteristics of each specific subject's PPG pulses. Inter-subject variability in heart rate may lead to misclassification of good quality pulses. This issue is addressed by adaptively adjusting the pulse templates' duration to the first pulse 22 duration. This provides the adapted pulse template 34 and is illustrated in FIG. 4 wherein the determined duration tD of the first pulse 22 is used to adapt the pulse template 32 in duration, generating the adapted pulse template 34.

Each pulse of the PPG signal 10, besides the pulses already rejected, is compared to the pulse templates to derive the degree of similarity of their morphology. This morphological comparison is quantified as the difference in area under the curve between the pulse template and the pulse.

As previously mentioned, physiological variability may lead to slight variations in PPG pulses. The method 1 may use Dynamic Time Warping DTW to adjust the first pulse 22 for small physiological changes. The DTW time-stretches the pulse waveform to maximize the similarity with the pulse template 34, keeping the amplitude invariant. However, in order to avoid an excessively distorted pulse, the DTW may be constrained by a maximum deviation based on the average pulses' T2P.

Figure 5:
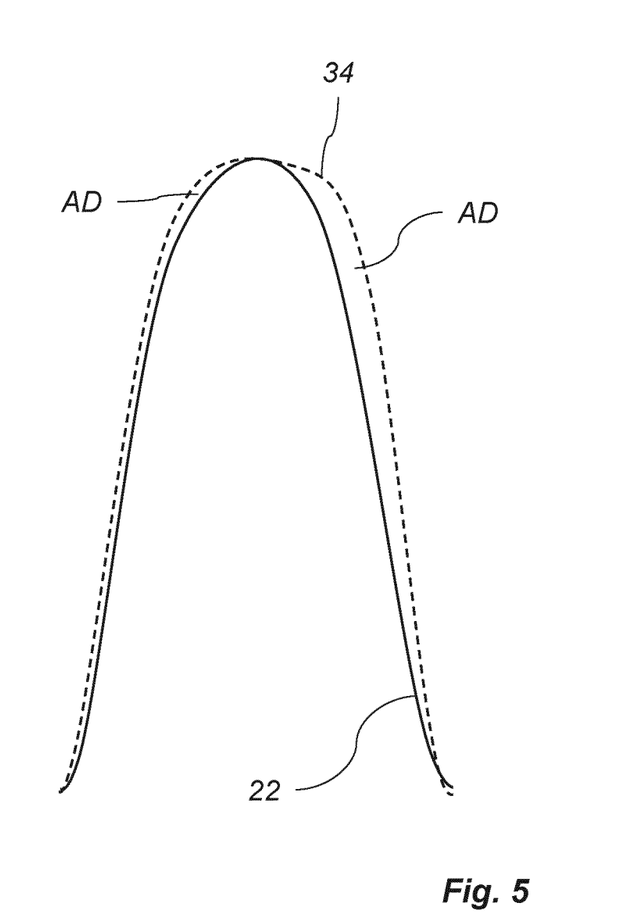
FIG. 5 is a schematic diagram of a morphological comparison according to an embodiment of the invention.

Further, as illustrated in FIG. 5, the determination of difference of the areas AD is, e.g. in the embodiment using DTW, determined by comparing the areas under the curves of the DTW-adjusted pulse and pulse template 34. When the difference between the two areas is below the predetermined threshold, i.e. close to zero, the BQ for the first pulse 22 is set to 1. On the contrary, when the difference is above the threshold, i.e. high, the BQ is set to 0. This is performed for each pulse template selected for adaption and morphological comparison with the first pulse.

Since there is no upper limit for the difference between the two areas, a maximum difference, i.e. the threshold, may be set as a proportion of the template area. This may for instance be determined as:

$$\max_{diff} * \text{area}_{template}$$

where $\max_{diff}$ is a scalar value. This would allow for a quality value QV varying between 0 and 1:

$$QV = 1 - \frac{\min(\text{area}_{diff}, \max_{diff} * \text{area}_{template})}{\max_{diff} * \text{area}_{template}}$$

The threshold THR is set to separate pulses based on their quality:

$$BQ_{pulse} = \begin{cases} 1 & \text{if } QV > THR \\ 0 & \text{otherwise} \end{cases}$$

where $BQ_{pulse}$ is the binary quality value BQ assigned to each pulse.

Figure 6:
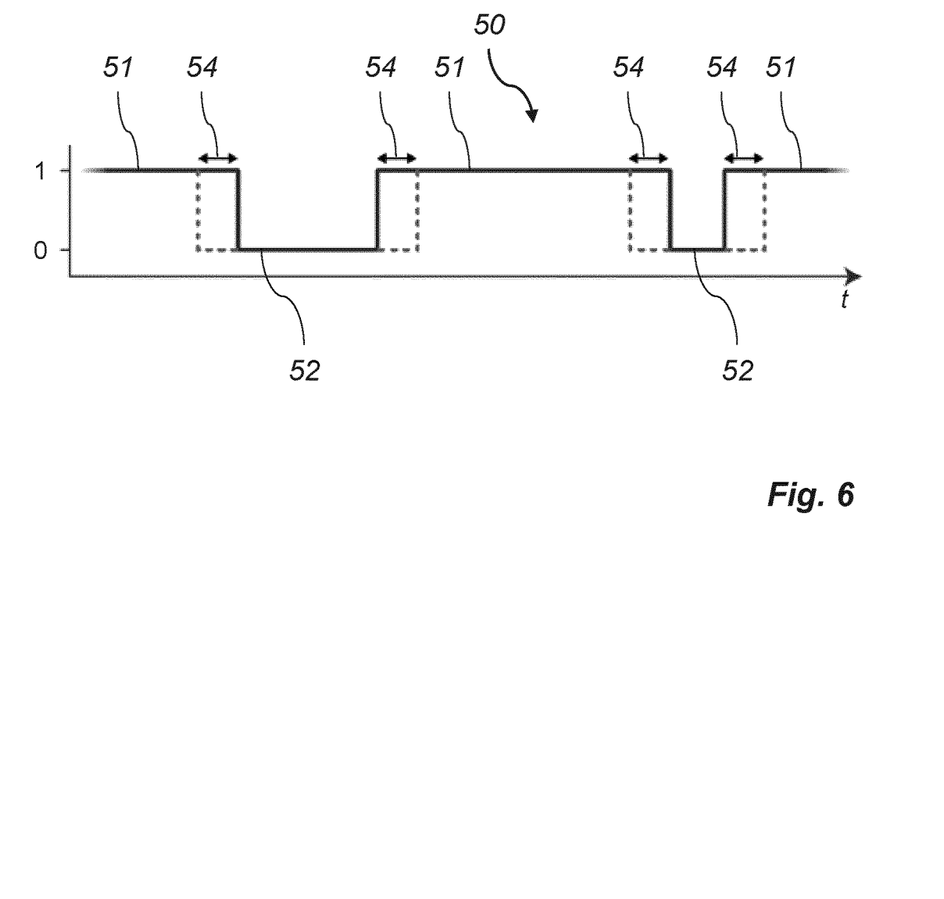
FIG. 6 is a schematic diagram of a binary quality vector according to an embodiment of the invention.

The incoming PPG signal 10 comprises a plurality of pulses, as in in FIGS. 1 and 2. The present invention relates to a method 1 to evaluate one or more pulses measured and identified in the PPG signal 10. The measurement may thereby be improved by identifying bad quality pulses and removing them from the measurement. Hence, the described evaluation may be performed for every pulse of the PPG signal 10. Each pulse will thereby be assigned a binary quality value BQ, together forming a quality signal vector 50 representing the quality of the pulses of the PPG signal 10. Such quality signal vector 50 is illustrated in FIG. 6.

Further from the evaluation of pulses as described above, a post-processing function may be applied in order to detect misclassified pulses, and to remove periods surrounding bad quality signal periods in the PPG signal 10.

First, a filter is applied to a binary time-series composed of the pulses' BQs ($BQ_{pulse}$) to identify possible misclassification. A sliding window scrolls over the $BQ_{pulse}$ and identifies periods where a good quality pulse is surrounded by bad quality pulses, and vice versa. In the case where a pulse with a good quality index ($BQ_{pulse}==1$) is surrounded by pulses with bad quality indexes ($BQ_{pulse}==0$), the pulse's BQ is changed to zero. On the contrary, when a pulse with a bad quality index is surrounded by pulses with good quality indexes, an additional check on the pulse amplitude may be performed. If the pulse amplitude is comparable with the mean of the surrounding pulse amplitudes, then its value is changed to 1.

Finally, a degree of flexibility can be assigned to the filter, where only a portion of the values in the window are used for the above-described assessment. The filter can be summarized with the following formulas:

$$BQ_{pulse}(t) =$$

$$\begin{cases} 1 \to 0 \text{ if } \sum_{i=-\frac{n-1}{2}}^{\frac{n-1}{2};i \neq 0} x(t+i) \leq C_{flex} \\ 0 \to 1 \text{ if } \sum_{i=-\frac{n-1}{2}}^{\frac{n-1}{2};i \neq 0} x(t+i) \geq C_{flex} \ \& \ A_{pulse}(t) \in [0.5, 1] * \frac{1}{n-1} \sum_{i=-\frac{n-1}{2}}^{\frac{n-1}{2};i \neq 0} A_{pulse}(t+i) \end{cases}$$

$$C_{flex} \in \left[0, \frac{n-1}{2}\right]$$

where x is the $BQ_{pulse}$ time-series, $C_{flex}$ is the degree of flexibility, $A_{pulse}$ is the amplitude of the pulse, and n is the length (odd) of the sliding window.

As illustrated in FIG. 6, a binary quality vector 50 is built from the $BQ_{pulse}$ to assess the quality of the PPG signal 10. The binary quality signal 50 has value of one in periods 51 of pulses with determined good quality, and zero in periods 52 otherwise. The binary quality signal 50 is initialized as zeros for a length equal to the PPG signal 10 length, and its values are changed depending on $BQ_{pulse}$. Where the $BQ_{pulse}$ is equal to 1, the entire signal period corresponding to that pulse is set as one, and left as zero otherwise.

Signal segments surrounding bad quality periods 52 may contain unreliable pulse quality information. For this reason, such segments may be labeled as bad quality. Hence, first the previously defined bad quality periods 52 are defined from the binary quality vector 50, and then the bad quality periods 52 are extended by a predetermined amount 54, as seen in FIG. 6.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method of evaluating a detected pulse in a Photoplethysmography, PPG, signal in a PPG signal measurement, comprising the steps of
   (a) receiving the PPG signal comprising a plurality of pulses;
   (b) extracting pulses from the received PPG signal;
   (c) providing a plurality of predetermined pulse templates comprising at least two predetermined pulse templates defining different pulse shapes of PPG pulses;
   (d) selecting one or more pulse templates out of the provided predetermined pulse templates;
   (e) adapting the selected one or more pulse templates to the shape of a first pulse out of the identified pulses in the PPG signal;
   (f) performing a morphological comparison between the first pulse and the adapted one or more pulse templates to provide a quantification of the difference between the first pulse and each of the adapted one or more pulse templates; and
   (g) evaluating the detected pulse based on the quantification of the difference between the first pulse and each of the adapted one or more pulse templates;
   wherein the step of (f) performing a morphological comparison comprises the steps of
   (f1) performing a Dynamic Time Warping, DTW, stretch of the first pulse,
   (f2) determining a difference in area (AD) under the curve of the DTW stretched first pulse and the curve of each of the adapted one or more pulse templates, and
   (f3) comparing the difference in area (AD) with a predetermined threshold.

2. The method according to claim 1, wherein the step of (b) extracting pulses further comprising a step of (b3) pulse normalization of the PPG signal prior to the step (e) of adapting the one or more pulse templates to the shape of the first pulse.

3. The method according to claim 1, wherein the step of (b) extracting pulses in the PPG signal comprises a step of identifying valleys in the PPG signal and define a pulse as a portion of the PPG signal between two consecutive valleys, and wherein information of the identified pulses is extracted, said information comprises at least one of: amplitude (AMP) of the pulse, duration (tD) of the pulse, and time to peak (T2P) of the pulse.

4. The method according to claim 1, further comprising a step of (b2) rejecting one or more identified pulses in the PPG signal prior to the step (e) of adapting the pulse template to the shape of the first pulse.

5. The method according to claim 4, wherein the step of (b) extracting pulses from the PPG signal comprises extracting information of the amplitude (AMP) of the identified pulses and/or the duration (tD) of the identified pulses, and the step of (b2) rejecting one or more identified pulses comprises a step of determining whether the amplitude and/or duration of an identified pulse deviates from the amplitude and/or duration compared to a previous pulse or pulses with a predetermined amount, and wherein the identified pulse is rejected if its amplitude and/or duration deviate with the predetermined amount or more.

6. The method according to claim 1, wherein the step of (f) performing a morphological comparison further comprises a step of (f4) determining a binary quality value (BQ) of the first pulse as 1 if the difference in area is below said predetermined threshold and as 0 if the difference in area is above said predetermined threshold.

7. The method according to claim 1, wherein the step of (e) adapting the selected one or more pulse templates comprises a step of (e1) normalizing the one or more pulse templates.

8. The method according to claim 1, wherein the step of (e) adapting the selected one or more pulse templates comprises a step of (e2) adapting the duration of each of the one or more pulse templates to correspond to a duration (tD) of the first pulse.

9. The method according to claim 1, further comprising a step of (g) detecting misclassifications of the first pulse after the morphological comparison.

10. The method according to claim 9, wherein steps (d)-(f) are performed for a plurality of PPG pulses in the PPG signal, and the step of (g) detecting misclassifications comprises a step of (g1) comparing a binary quality value (BQ) of the first pulse with binary quality values of at least two pulses adjacent to the first pulse in the PPG signal; and, if the binary quality value for the first pulse is 1 and the binary quality values for the at least two adjacent pulses are 0, a step of (g2) change the binary quality value of the first pulse to 0.

11. The method according to claim 10, wherein the step of (g) detecting misclassifications comprises a step of (g3) forming a signal vector by the binary quality values (BQ) of the plurality of pulses of the PPG signal, indicating a value of 0 in periods of the PPG signal comprising pulses determined to have a binary quality value of 0 and a value of 1 in periods of the PPG signal comprising pulses determined to have a binary quality value of 1, and wherein a border between a 1 value period to a 0 value period in the signal vector is adjusted by a predetermined duration to increase the duration of the 0 value period.

12. The method according to claim 1, wherein the step of (d) selecting one or more pulse templates is performed by selecting at least two pulse templates, the step of (e) adapting the selected one or more pulse templates to correspond to the shape of the first pulse is performed by adapting the selected at least two pulse templates, and the step of (f) performing a morphological comparison is performed separately using all of said selected and adapted at least two pulse templates.

13. The method according to claim 1, wherein the pulse template is provided in a database of pulse templates, and the plurality of pulse templates used for the selection of a pulse template to be used for morphological comparison are at least a portion of the pulse templates in the database.

14. An apparatus comprising one or more processing units, a memory unit, and one or more sensor devices, the apparatus being configured to perform the steps of the method according to claim 1.

* * * * *